US006917826B2

(12) United States Patent
Wei et al.

(10) Patent No.: US 6,917,826 B2
(45) Date of Patent: Jul. 12, 2005

(54) AUTOMATIC AND QUANTITATIVE ASSESSMENT OF IMAGE QUALITY IN SPECT MYOCARDIAL PERFUSION IMAGING

(75) Inventors: Guo-Qing Wei, Plainsboro, NJ (US); Jianzhong Qian, Princeton Junction, NJ (US); John C. Engdahl, Lake Forest, IL (US)

(73) Assignee: Siemens Corporate Research, Inc., Princeton, NJ (US)

( * ) Notice: Subject to any disclaimer, the term of this patent is extended or adjusted under 35 U.S.C. 154(b) by 407 days.

(21) Appl. No.: 10/061,986

(22) Filed: Feb. 1, 2002

(65) Prior Publication Data

US 2003/0149356 A1 Aug. 7, 2003

(51) Int. Cl.$^7$ .............................................. A61B 5/05
(52) U.S. Cl. ....................... 600/407; 600/425; 600/410; 600/408; 600/437; 382/131; 382/132; 382/164; 382/171; 382/173; 128/898; 128/922; 128/923
(58) Field of Search ............................... 600/407, 410, 600/408, 425, 437, 440, 443, 450; 382/131, 132, 164, 171, 173; 128/898, 922, 923

(56) References Cited

U.S. PATENT DOCUMENTS 5,458,126 A * 10/1995 Cline et al. ................. 600/425
6,148,095 A * 11/2000 Prause et al. ............... 382/131
6,289,232 B1 * 9/2001 Jakob et al. ................ 600/410
6,473,636 B1 * 10/2002 Wei et al. ................... 600/436

* cited by examiner

Primary Examiner—Brian L. Casler
Assistant Examiner—William C. Jung
(74) Attorney, Agent, or Firm—Donald B. Paschburg; F. Chau & Associates, LLC (57) ABSTRACT

A system and method for automatic quantitative assessment of myocardial image quality includes a liver-heart artifact quantification unit for providing a sequence of images, detecting the heart position in each image, segmenting non-heart activity relative to the detected heart positions, measuring the liver-heart effect in each image based on the segmentations, fusing the measurements obtained in each image, and determining a quality number for the plurality of images responsive to the fused measurements; and also includes a heart detection unit for receiving the image sequence, generating a region of interest comprising the heart by 1-D pseudo-motion analysis of the image sequence, localizing the heart center by a training-based algorithm, fitting a curve to the localized heart centers of each image in the sequence, refining the heart center positions of localized heart centers falling outside of a tolerance distance from the fitted curve, and determining a bounding circle comprising the heart in accordance with the localized and refined heart center positions.

20 Claims, 6 Drawing Sheets

AUTOMATIC AND QUANTITATIVE ASSESSMENT OF IMAGE QUALITY IN SPECT MYOCARDIAL PERFUSION IMAGING

BACKGROUND

Non-invasive, high-resolution computed tomography scanners are capable of providing detailed imaging data on anatomical structures. In the single-photon emission computed tomography ("SPECT") of nuclear medicine, the filtered back-projection algorithm has been the most popular method used for heart image reconstruction in order to facilitate the diagnoses of coronary artery diseases. Non-invasive early recognition of heart features from SPECT images holds great promise. Unfortunately, the high uptakes of liver activities and of other organs sometimes cause false artifacts in the inferior/inferoseptal myocardial wall of the reconstruction (see G. Germano et al., "A quantitative phantom analysis of artifacts due to hepatic activity in Technetium-99 m myocardial perfusion SPECT studies", *Journal of Nuclear Medicine*, Vol.35, No.2, Feb. 1994, pp.356–359).

This phenomenon is also called "liver-heart cross-talk". A direct consequence of liver-heart cross-talk is that liver-heart artifacts may be confused with features generally caused by heart diseases, leading to potentially incorrect diagnoses by physicians relying on the reconstructed images.

SUMMARY

These and other drawbacks and disadvantages of the prior art are addressed by a system and method for automatic quantitative assessment of myocardial image quality that includes a liver-heart artifact quantification unit for: providing a sequence of images, detecting the heart position in each image, segmenting non-heart activity relative to the detected heart positions, measuring the liver-heart effect in each image based on the segmentations, fusing the measurements obtained in each image, and determining a quality number for the plurality of images responsive to the fused measurements; and also includes a heart detection unit for: receiving the image sequence, generating a region of interest comprising the heart by 1-D pseudo-motion analysis of the image sequence, localizing the heart center by a training-based algorithm, fitting a curve to the localized heart centers of each image in the sequence, refining the heart center positions of localized heart centers falling outside of a tolerance distance from the fitted curve, and determining a bounding circle comprising the heart in accordance with the localized and refined heart center positions.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches an approach to automatically monitoring the image quality of single-photon emission computed tomography ("SPECT") images in accordance with the following exemplary Figures, in which.

DETAILED DESCRIPTION OF PREFERRED EMBODIMENTS

The present disclosure teaches a system and method for automatically monitoring the image quality of single-photon emission computed tomography ("SPECT") images. The method provides a quantitative measurement indicative of the extent of any cross-talk that may be occurring. Based on the measured image quality, physicians can take appropriate actions, such as, for example, to temporarily change to a more complex and/or computationally intensive reconstruction method to work around the problem. The method is based on detecting heart positions in each image frame and measuring the activity level around the heart positions in 2-D images.

In the SPECT branch of nuclear medicine, the filtered back-projection algorithm is typically used for heart image reconstruction in the diagnoses of coronary artery diseases. The high uptakes of liver activities often cause artifacts in the reconstructed heart that may, in turn, be confused with those caused by heart diseases. The present disclosure introduces a technique to automatically quantify the degree of such liver-heart artifacts before heart image reconstruction is made. With this technique, physicians can gain advance warning of the low image quality so that appropriate measures can be taken to avoid false diagnoses.

Figure 1:
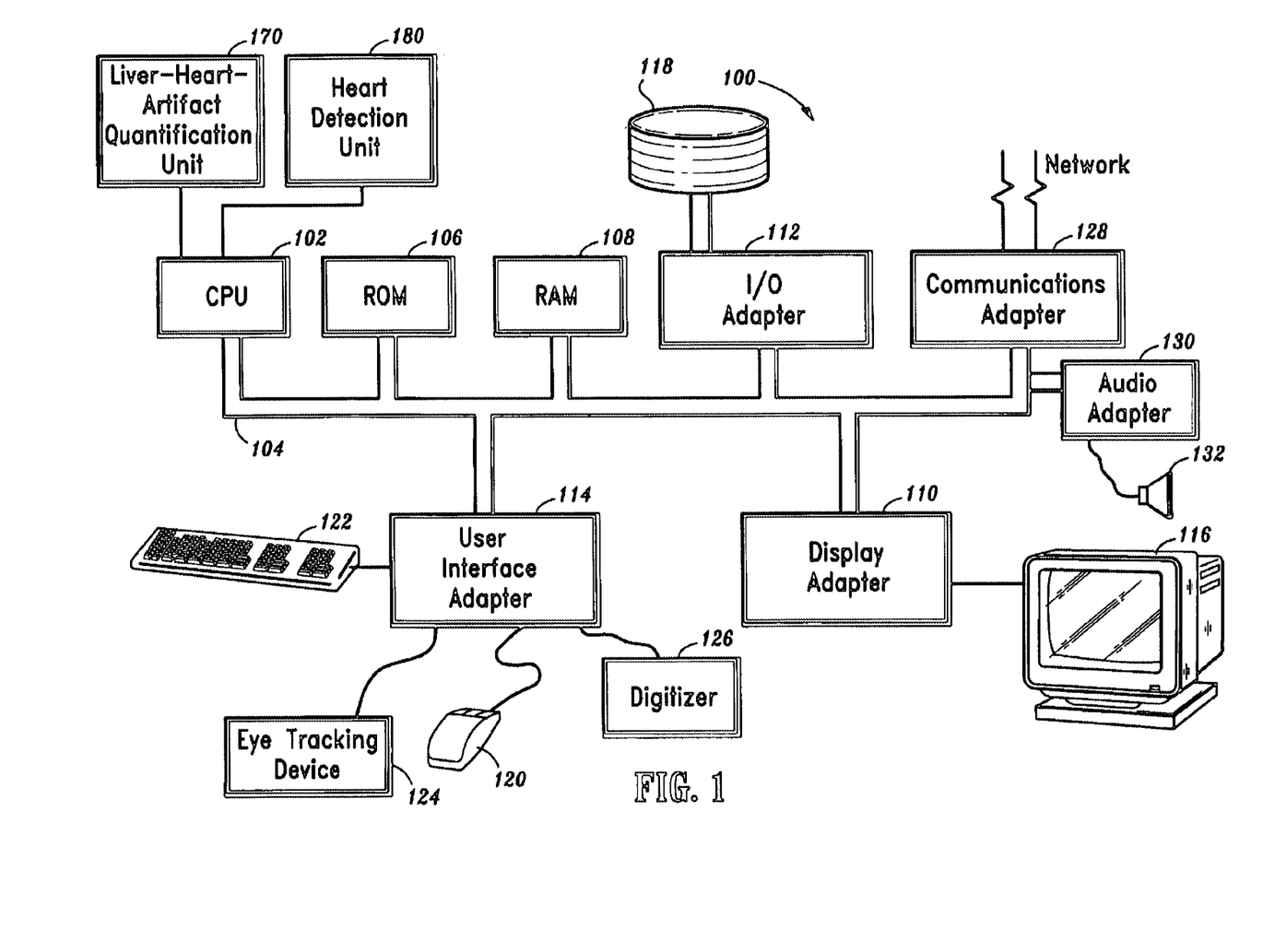
FIG. 1 shows a block diagram of a system for automatically assessing the quality of SPECT images according to an illustrative embodiment of the present disclosure.

FIG. 1 shows a block diagram of a system 100 for automatically quantifying the liver-heart artifacts, according to an illustrative embodiment of the present disclosure. The system 100 includes at least one processor or central processing unit ("CPU") 102 in signal communication with a system bus 104. A read only memory ("ROM") 106, a random access memory ("RAM") 108, a display adapter 110, an I/O adapter 112, and a user interface adapter 114 are also in signal communication with the system bus 104.

A display unit 116 is in signal communication with the system bus 104 via the display adapter 110. A disk storage unit 118, such as, for example, a magnetic or optical disk storage unit, is in signal communication with the system bus 104 via the I/O adapter 112. A mouse 120, a keyboard 122, and an eye tracking unit 124 are also in signal communication with the system bus 104 via the user interface adapter 114. The mouse 120, keyboard 122, and eye-tracking unit 124 are used to aid in the generation of selected regions in a digital medical image.

A liver-heart artifact quantification unit 170 and a heart detection unit 180 are also included in the system 100 and in signal communication with the CPU 102 and the system bus 104. While the liver-heart artifact quantification unit 170 and the heart detection unit 180 are illustrated as coupled to the at least one processor or CPU 102, these components are preferably embodied in computer program code stored in at least one of the memories 106, 108 and 118, wherein the computer program code is executed by the CPU 102.

The system 100 may also include a digitizer 126 in signal communication with the system bus 104 via a user interface adapter 114 for digitizing a SPECT image. Alternatively, the digitizer 126 may be omitted, in which case a digital SPECT image may be input to the system 100 from a network via a communications adapter 128 in signal communication with the system bus 104, or via other suitable means as understood by those skilled in the art.

As will be recognized by those of ordinary skill in the pertinent art based on the teachings herein, alternate embodiments are possible, such as, for example, embodying some or all of the computer program code in registers located on the processor chip 102. Given the teachings of the disclosure provided herein, those of ordinary skill in the pertinent art will contemplate various alternate configurations and implementations of the liver-heart artifact quantification unit 170 and the heart detection unit 180, as well as the other elements of the system 100, while practicing within the scope and spirit of the present disclosure.

Figure 2:
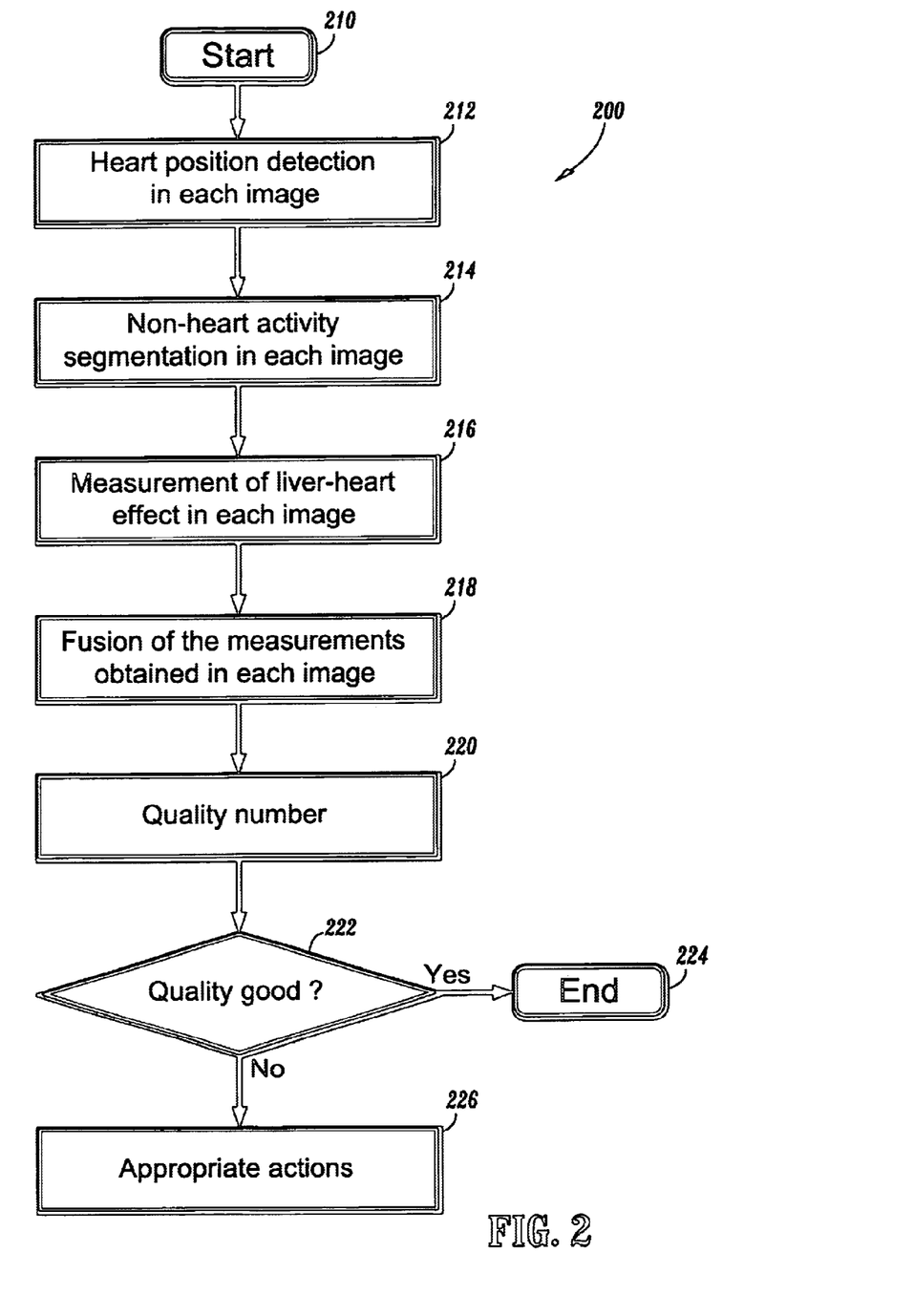
FIG. 2 shows a flow diagram illustrating a method for automatically performing liver-heart artifact quantification from SPECT images according to an illustrative embodiment of the present disclosure.

Turning to FIG. 2, a system flowchart is indicated generally by the reference numeral 200. A start block 210 leads to a function block 212 to perform heart position detection in each image. Block 212, in turn, leads to a function block 214 to perform non-heart activity segmentation in each image. Block 214 leads, in turn, to a function block 216 to perform measurement of liver-heart effect in each image. Next, block 216 leads to a function block 218 to perform fusion of the measurements obtained in each image. Block 218 leads to a function block 220 for determination of a quality number. Block 220 leads to a decision block 222, which determines whether the quality is good by comparing the quality number with a threshold. If the quality is good, the routine is completed at an end block 224. If, on the other hand, the quality is not good, control is passed to a function block 226 to perform appropriate actions consistent with poor quality images.

Figure 3:
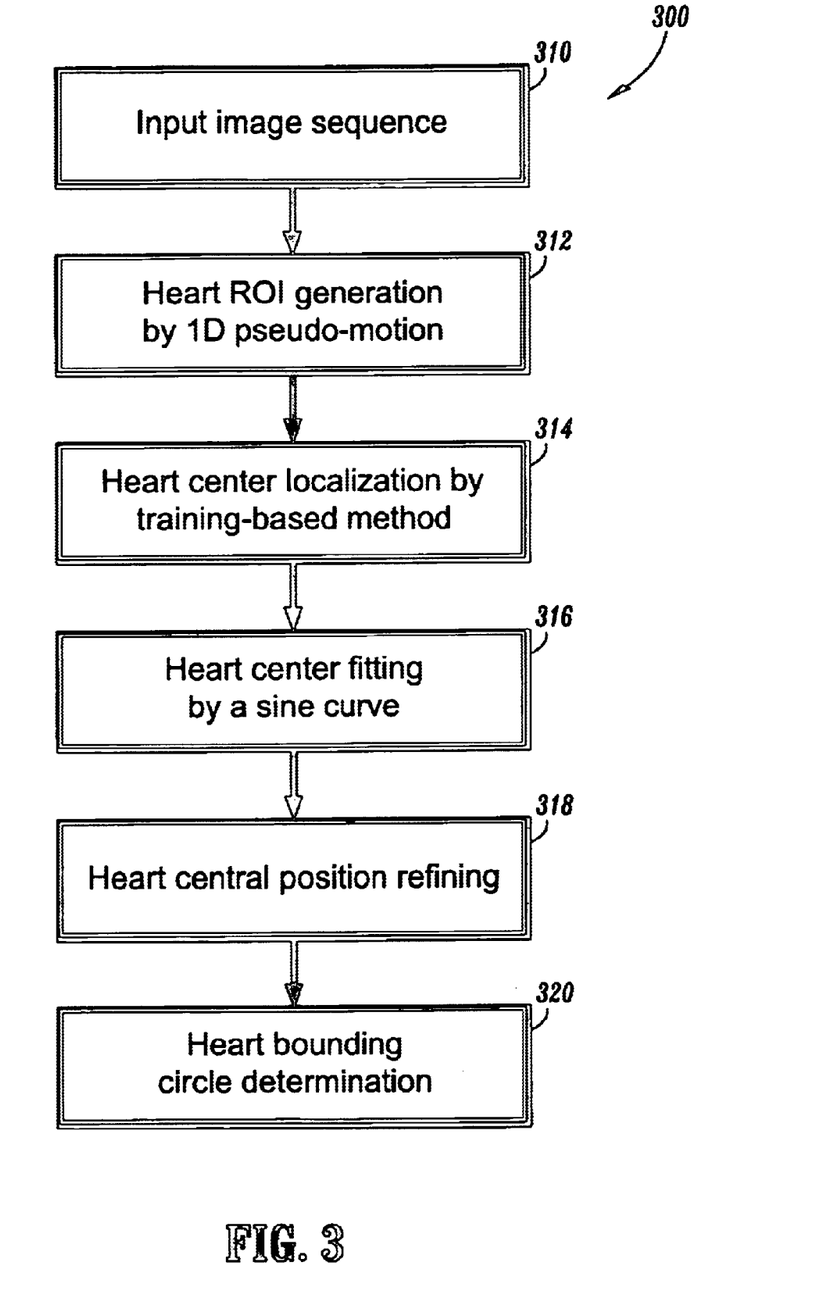
FIG. 3 shows a flow diagram illustrating a method for heart detection with curve-fitting according to the embodiment of FIG. 2.

As shown in FIG. 3, the heart position detection at block 212 of FIG. 2 is indicated generally by the flowchart 300. A function block 310 receives an input image sequence, and leads to a function block 312 to perform heart region-of-interest ("ROI") generation by 1-dimensional ("1-D") pseudo-motion analysis. Block 312 leads to a function block 314 to perform heart center localization by a training-based method. Block 314, in turn, leads to a function block 316 to fit a sine curve to the heart centers of the images. Block 316 leads to a function block 318 to refine the heart center positions. Block 318 leads to a function block 320 to determine the heart bounding circle.

In operation, heart detection includes the step 312 for ROI determination by using 1-D pseudo motion analysis (see Xu, Chou, and Qian "Determining the position range of the heart from a sequence of projection images using 1-D pseudo motion analysis", U.S. Pat. No. 5,682,887, 1997). Thus, a ROI containing the heart can be determined. This ROI gives an upper limit and a lower limit in the vertical direction of the images (see, e.g., FIG. 6).

The training-based heart detection of block 314 is based on two steps: off-line training and on-line detection. In the off-line stage, typical heart images are extracted manually. Using principal component analysis, the prototype heart images or eigen-images are determined. They are then used in the on-line detection stage to detect the heart position at each frame. Here, the heart position means the center of gravity of the heart projection in the image. The detection of the heart position should be independent of the level of counts or intensity of the image. The technique used to achieve this heart detection is disclosed in co-pending attorney docket no. 2001E13792US (8706–554), entitled "An Integrated Approach to Brightness and Contrast Normalization in Appearance-based Object Detection" by Wei, Qian and Engdahl, filed herewith, and incorporated by reference herein in its entirety.

The heart positions are detected in each frame independently in the previous step. The operation of steps 316 and 318 follows the detection of heart positions. It is known from SPECT imaging that the heart trajectory should follow a sine curve due to the pattern of camera motions. This prior knowledge can be used to correct detection errors in individual frames. If $\{(x_i, y_i), i=1,2,\ldots N\}$ are the coordinates of the detected heart positions, then the x-coordinates should satisfy a sine curve:

$$x_i = A \sin(ki+\theta) \tag{1}$$

where A, k, and θ are the parameters of the sine curve. The x-coordinates of the detected heart positions are fitted by minimizing the following error function:

$$E = \sum_{i=1}^{N} \rho_i(d_i) d_i^2 \tag{2}$$

$$d_i = x_i - A \sin(kx_i+\theta) \tag{3}$$

with respect to the parameters A, k, and θ where ρ(d) is a weighting function used to exclude outliers, outliers being detected positions whose errors are too large to satisfy a sine curve; $d_i$ is the error of fit for the i-th image. The function ρ(d) is chosen such that when the error d becomes larger, the weight becomes less:

$$\rho(d) = e^{-d^2/\sigma^2} \tag{4}$$

In this way, frames in which the errors of heart positions are too large will have negligible effect on the final fitting result; that is, the fitting is mainly based on the heart positions that satisfy a sine trajectory. The minimization of equation (2) over A, k, and θ is achieved iteratively as follows. First, an initial estimate of the variables A, k, and θ are obtained based on the detected positions. Then the residual error of equation (3) is calculated for each frame. Based on that, the weight of equation (4) for each frame is determined. The obtained weights are substituted into equation (2), and the resulting error function E is minimized over A, k, and θ to get a new estimate of the parameters. This procedure is repeated until convergence is reached.

After the heart trajectory is fitted in step 316, the image frames are identified in which the distance of the detected heart position to the trajectory is greater than a threshold. The heart positions in these frames are refined in step 318. Since the trajectory provides an approximate heart position for these frames, the above procedure is applied again to a small neighborhood of these predicted heart positions. An improved heart position is then returned for each of these frames.

After the heart's center is localized, step 320 determines the bounding circle of the heart. The bounding circle is the minimum circle that contains the heart. Starting from the heart center, a circle is grown while computing the average intensity within each circle. In this way, a profile of the average intensity is obtained. The shape of the profile curve will show an increasing average intensity at the beginning and then a falling average intensity. The bounding circle is determined as the circle at which the average intensity starts to fall.

Returning now to FIG. 2, the operation of the non-heart activity segmentation of step 214 is considered. From the bounding circles, the average level of the heart activity or intensity across all frames can be computed. Non-heart activities, such as those of the liver, with intensity levels near or above the average heart activity and located within a certain range of distance from the heart, will have interference with the heart in a 3-D reconstruction. Therefore, these non-heart activities are to be segmented. Since the average heart activity has been computed, the segmentation can be done by setting a threshold near the average heart activity. Pixels with intensities above the threshold and lying outside of the bounding circles are segmented as non-heart activities.

At step 216, the liver-heart effect or artifact is quantified. The strength of the liver-heart artifact depends on several factors. First, the higher the level of non-heart activities, the stronger the liver-heart artifact. Second, non-heart activities that are closer to the heart will have larger negative effects. Third, the artifact is proportional to the size of the non-heart activities. Based on these relationships the degree of liver-heart artifact at the i-th frame is quantified by the following measurement:

$$Q_i = \frac{\text{weighted\_nonheart\_intensity}}{\text{average\_heart\_intensity}} \cdot \frac{\text{number\_nonheart\_pixels}}{\text{heart\_area}} \quad (5)$$

where $$\text{weighted\_nonheart\_intensity} = \frac{\sum_n I_n w_n}{\sum_n w_n} \quad (6)$$

The variable $I_n$ is the intensity level of the n-th non-heart pixel, $w_n$ is the weight assigned to this pixel, which is computed as being inversely proportional to the distance of the pixel to the heart. The value of the variable $Q_i$ is normalized to lie between 0 and 1. A low value means less liver-heart cross-talk, while a value near 1 indicates a strong liver-heart interference.

At step 218, fusion of the measurements obtained in each image is performed. Based on equation (5), the liver-heart cross-talk of the i-th frame can be quantified. The quantifications for all the frames need to be integrated to give a single number indicating the overall quality of the image sequence. Since liver-heart cross-talk usually occurs for consecutive frames, local averages of the measurements $\{Q_i\}$ are made to remove any spurious measurement errors. The size of the averaging window is chosen to be 5 units in this exemplary embodiment. The final quality number is chosen to be the maximum of the smoothed measurements. The above procedure of fusing individual measurements to get the final quality number can be expressed in the following form:

$$Q = \max\left\{\sum_{k=-2}^{2} Q_i\right\} \quad (7)$$

Figure 4:
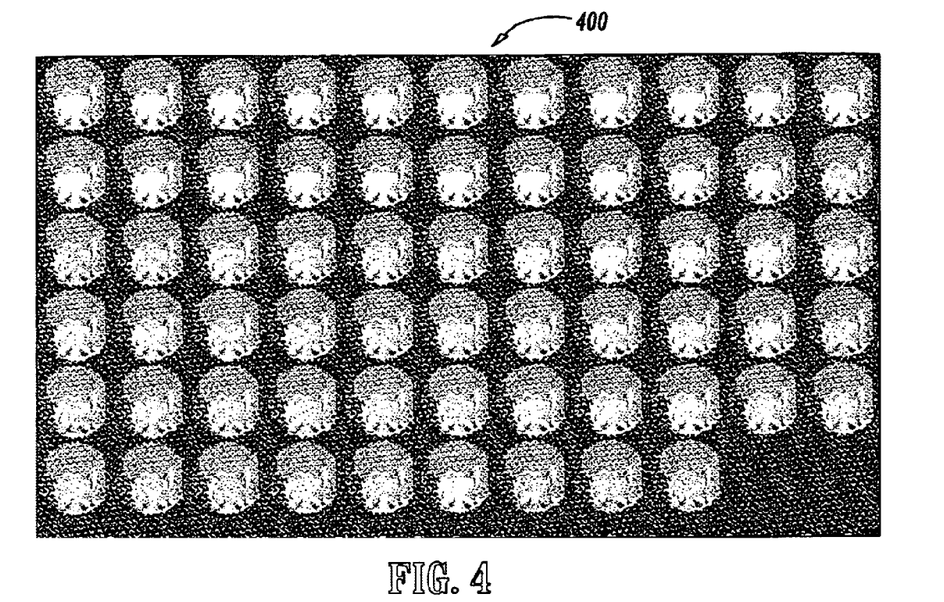
FIG. 4 shows an original image sequence.
Figure 5:
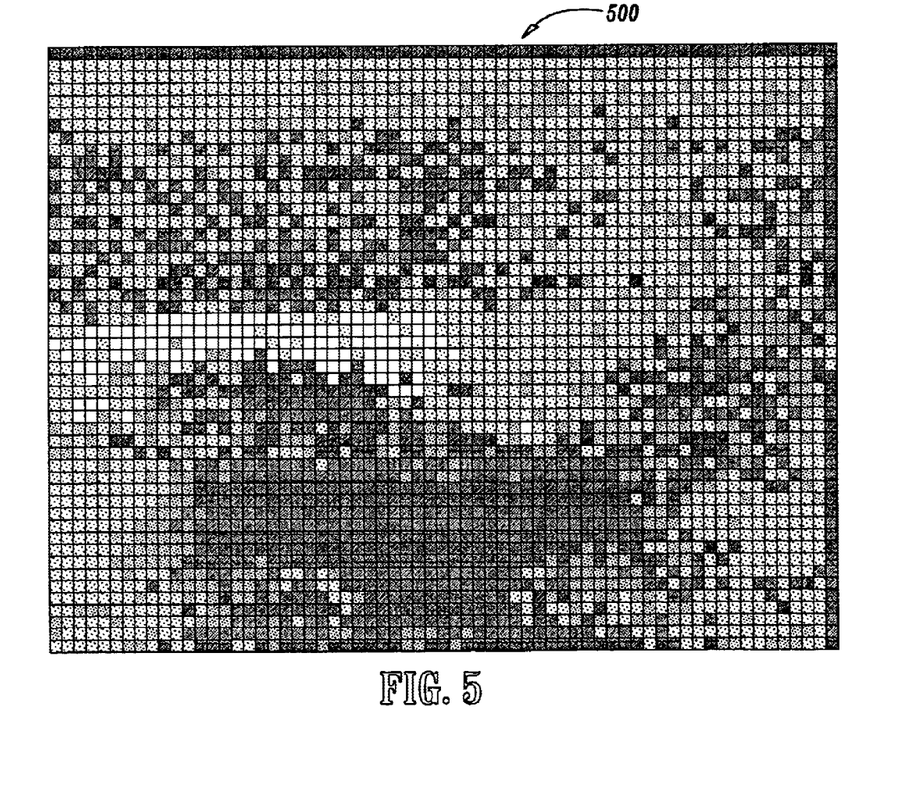
FIG. 5 shows a pseudo-motion map of the image sequence of FIG. 4.
Figure 6:
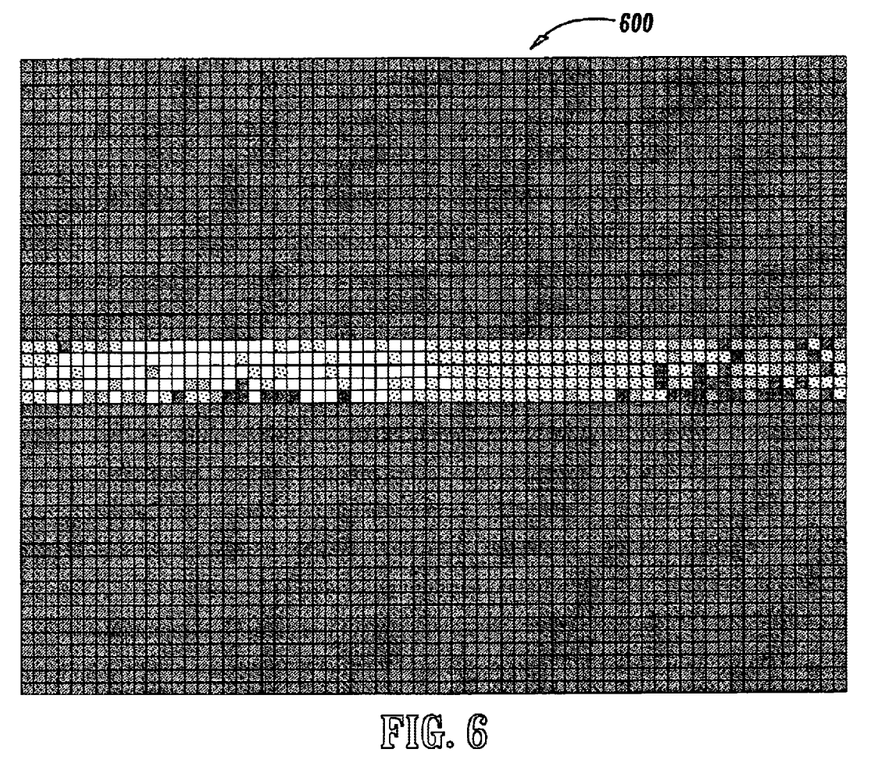
FIG. 6 shows an extracted pseudo-motion map corresponding to the heart in accordance with FIG. 5.
Figure 7:
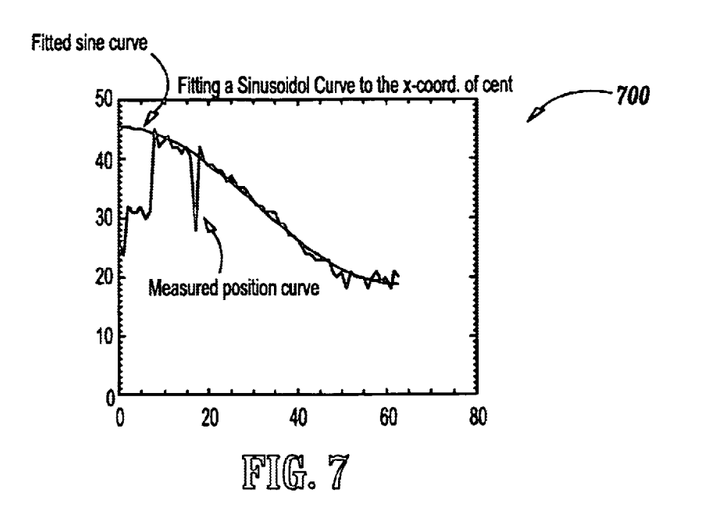
FIG. 7 shows a trajectory fitting procedure on the detected heart positions of FIG. 6.
Figure 8:
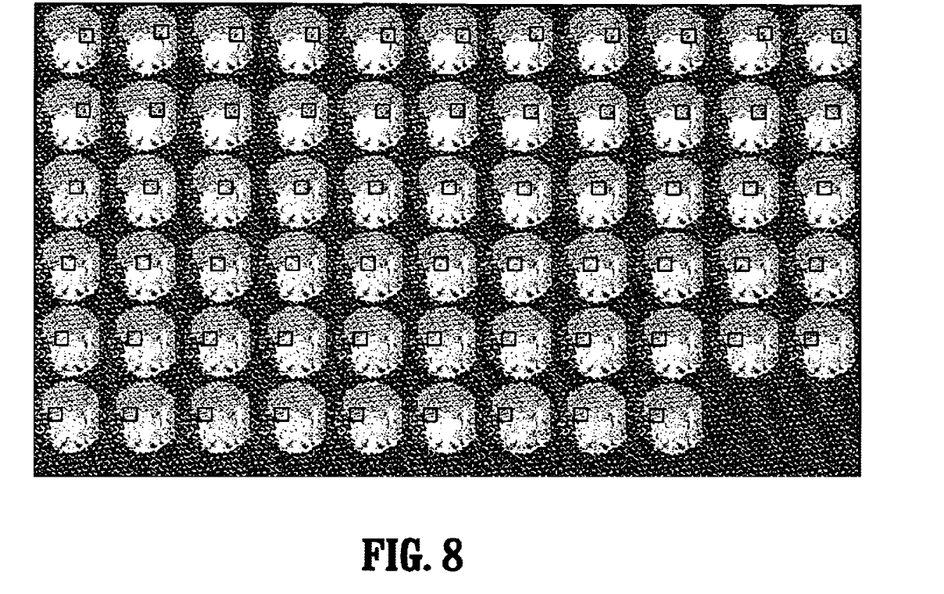
FIG. 8 shows detected heart positions as bounding boxes overlaid on the heart images of FIG. 4.
Figure 9:
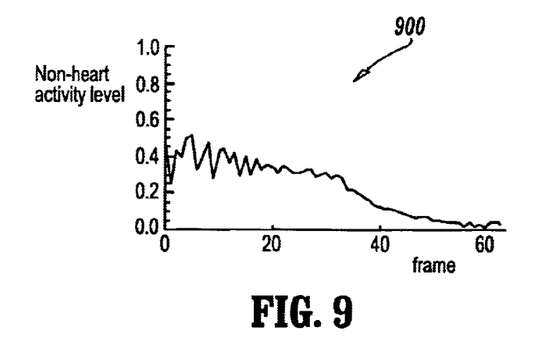
FIG. 9 shows the non-heart activity measurement curve for all of the frames of FIG. 8.
Figure 10:
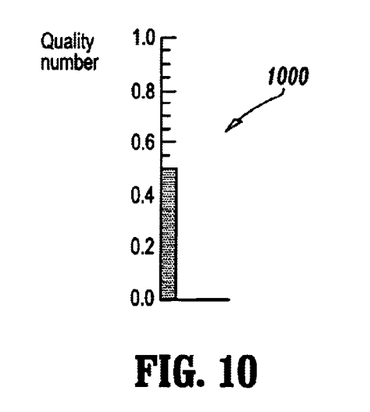
FIG. 10 shows a bar chart indicating a quality number extracted from the curve of FIG. 9.

Turning now to FIGS. 4 through 10, an example is illustrated of quality measurement in accordance with an embodiment of the present disclosure. In FIG. 4, reference numeral 400 indicates an original image sequence. In FIG. 5, reference numeral 500 indicates the pseudo-motion map of the image sequence 400. In FIG. 6, reference numeral 600 indicates the extracted pseudo-motion map corresponding to the heart. The upper and lower boundaries of the band in the extracted pseudo-motion map are the heart position's upper and lower limits used in the following detection. In FIG. 7, reference numeral 700 generally indicates the trajectory fitting procedure on the detected heart positions. Here, the x-axis represents the frame number and the y-axis represents the x-coordinates of the detected positions. It can be seen that even large detection errors can still be corrected based on the fitting. In FIG. 8, reference numeral 800 generally indicates the detected heart positions, which are shown as bounding boxes overlaid on the heart images. In FIG. 9, reference numeral 900 generally indicates the non-heart activity measurement curve for all of the frames. In FIG. 10, reference numeral 1000 indicates the quality number extracted from the curve 900, shown here as a bar chart. The height of the bar is indicative of the value of the quality number.

The quality number obtained can be used by physicians for guidance as to whether to take appropriate actions. For example, if the quality number is close to 0 or poor, alternate 3D reconstruction methods, instead of the popular back-projection method, can be used to reduce the artifacts at the expense of longer computational time for reconstruction, for example.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed via an operating system. In addition, various other peripheral units may be connected to the computer platform such as an additional data storage unit and a printing unit.

It is to be further understood that, because some of the constituent system components and method function blocks depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for automatic quantitative assessment of myocardial image quality, the method comprising:
   providing a plurality of images;
   detecting the heart position in each provided image;
   segmenting non-heart activity relative to the detected heart position in each image;
   measuring the liver-heart effect in each image relative to the segmentations;
   fusing the measurements obtained in each image;
   determining a quality number for the plurality of images responsive to the fused measurements; and
   alerting a user to low image quality if the quality number is less than a threshold.

2. A method as defined in claim 1, further comprising:
   comparing the quality number with a threshold; and
   performing appropriate actions if the quality number is poor relative to the threshold.

3. A method as defined in claim 1 wherein detecting the heart position in each image comprises:
   receiving an image sequence;
   generating a region of interest comprising the heart by 1-D pseudo-motion analysis of the image sequence;
   localizing the heart center by a training-based algorithm;
   fitting a curve to the localized heart centers of each image in the sequence;
   refining the heart center positions of localized heart centers falling outside of a tolerance distance from the fitted curve; and
   determining a bounding circle comprising the heart in accordance with the localized and refined heart center positions.

4. A method as defined in claim 3 wherein said curve is a sine curve for compensating for the motion of an imaging device.

5. A method as defined in claim 1 wherein said images comprise single-photon emission computed tomography images.

6. A system (100) for automatic quantitative assessment of myocardial image quality, the system comprising:
   a heart detection unit (180) for heart detection, outlier detection and outlier correction;
   a liver-heart artifact quantification unit (170) responsive to the heart detection unit for determining a quality number indicative of the severity of image-quality induced liver-heart; and
   an output device (116. 132) for alerting a user to low image quality if the quality number is less than a threshold.

7. A system (100) as defined in claim 6 wherein the images comprise single-photon emission computed tomography images.

8. A system (100) for automatic quantitative assessment of myocardial image quality, the system comprising:
   a heart detection unit (180) for heart detection, outlier detection and outlier
   a liver-heart artifact quantification unit (170) responsive to the heart detection unit for determining a quality number indicative of the severity of image-quality induced liver-heart artifacts; and
   a CPU (102) in signal communication with said liver-heart artifact quantification unit (170) for processing the images.

9. A system (100) as defined in claim 8, further comprising:
   a display adapter (110) in signal communication with the CPU (102) for displaying the images; and
   an I/O adapter (112) in signal communication with the CPU (102) for recalling the quantified features of the corresponding structure of the images to provide an automatic assessment of myocardial image quality corresponding to a selected image.

10. A system (100) as defined in claim 8, further comprising:
    a user interface adapter (114) in signal communication with the CPU (102) for at least receiving a selection decision for at least one image from a user.

11. A system for automatic quantitative assessment of myocardial image quality, the system comprising:
    input means for providing a plurality of images;
    detection means in signal communication with said input means for detecting the heart position in each provided image;
    segmentation means in signal communication with said detection means for segmenting non-heart activity relative to a detected heart position in each image;
    measurement means in signal communication with said segmentation means for measuring the liver-heart effect in each image based on the segmentations;
    fusion means in signal communication with said measurement means for fusing measurements obtained in each image;
    determination means in signal communication with said fusion means for determining a quality number for the plurality of images responsive to fused measurements; and
    output means for alerting a user to low image quality if the quality number is less than a threshold.

12. A system as defined in claim 11, further comprising:
    comparison means in signal communication with said determination means for comparing the quality number with a threshold; and
    action means in signal communication with said comparison means for performing appropriate actions if the quality number is poor relative to the threshold.

13. A system as defined in claim 11 wherein said detection means comprises:
    reception means for receiving an image sequence;
    generation means in signal communication with said reception means for generating a region of interest comprising the heart by 1-D pseudo-motion analysis of the image sequence;
    localization means in signal communication with said generation means for localizing the heart center by a training-based algorithm;
    fitting means in signal communication with said localization means for fitting a curve to the localized heart centers of each image in the sequence;

refining means in signal communication with said fitting means for refining the heart center positions of localized heart centers falling outside of a tolerance distance from the fitted curve; and bounding means in signal communication with said refining means for determining a bounding circle comprising the heart in accordance with the localized and refined heart center positions.

14. A system as defined in claim 13 wherein said curve is a sine curve for compensating for the motion of an imaging device.

15. A system as defined in claim 11 wherein said images comprise single-photon emission computed tomography images.

16. A program storage device readable by machine, tangibly embodying a program of instructions executable by the machine to perform method steps for automatic quantitative assessment of myocardial image quality, the method steps comprising:

providing a plurality of images;

detecting the heart position in each provided image;

segmenting non-heart activity relative to the detected heart position in each image;

measuring the liver-heart effect in each image relative to the segmentations;

fusing the measurements obtained in each image; and determining a quality number for the plurality of images responsive to the fused measurements.

17. A program storage device as defined in claim 16, the method steps further comprising:

comparing the quality number with a threshold; and performing appropriate actions if the quality number is poor relative to the threshold.

18. A program storage device as defined in claim 16 wherein the step of detecting the heart position in each image comprises:

receiving an image sequence;

generating a region of interest comprising the heart by 1-D pseudo-motion analysis of the image sequence;

localizing the heart center by a training-based algorithm;

fitting a curve to the localized heart centers of each image in the sequence;

refining the heart center positions of localized heart centers falling outside of a tolerance distance from the fitted curve; and determining a bounding circle comprising the heart in accordance with the localized and refined heart center positions.

19. A program storage device as defined in claim 18 wherein said curve is a sine curve for describing the motion of an imaging device.

20. A program storage device as defined in claim 16 wherein said images comprise single-photon emission computed tomography images.

* * * * *